(12) United States Patent
Shimizu (10) Patent No.: US 7,697,034 B2
(45) Date of Patent: Apr. 13, 2010

(54) MOVING IMAGE PLAYBACK DEVICE WITH CAMERA-SHAKE CORRECTION FUNCTION

(75) Inventor: Hiroshi Shimizu, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 471 days.

(21) Appl. No.: 11/701,341

(22) Filed: Feb. 1, 2007

(65) Prior Publication Data

US 2009/0021590 A1    Jan. 22, 2009

(30) Foreign Application Priority Data

Feb. 3, 2006    (JP) ............................. 2006-027567

(51) Int. Cl.
    *H04N 5/228*    (2006.01)
(52) U.S. Cl. ................. 348/208.4; 348/208.1
(58) Field of Classification Search .............. 348/208.1, 348/208.4, 208.13, 222.1; 396/52
    See application file for complete search history.

(56) References Cited

U.S. PATENT DOCUMENTS

| | | | | |
|---|---|---|---|---|
| 6,501,503 | B2 * | 12/2002 | Kudo | 348/208.99 |
| 6,900,831 | B2 * | 5/2005 | Nishiwaki | 348/208.5 |
| 7,447,330 | B2 * | 11/2008 | Yamasaki | 382/100 |
| 2002/0047906 | A1 | 4/2002 | Ohta | |
| 2002/0080261 | A1 | 6/2002 | Kitamura et al. | |
| 2003/0174772 | A1 | 9/2003 | Voronov et al. | |

FOREIGN PATENT DOCUMENTS

| | | | |
|---|---|---|---|
| JP | 6-6669 | A | 1/1994 |
| JP | 2004088567 | A * | 3/2004 |

OTHER PUBLICATIONS

The International Search Report and the Written Opinion of the International Searching Authority, dated May 14, 2007 for PCT/JP2007/051874 (International Filing Date: Jan. 30, 2007). 10 pages.

* cited by examiner

*Primary Examiner*—Tuan Ho
*Assistant Examiner*—Don Nguyen
(74) *Attorney, Agent, or Firm*—Frishauf, Holtz, Goodman & Chick, P.C.

(57) ABSTRACT

When a blurring correction is performed when shooting a moving image, a digital camera performs blurring correction on the picked up frames and successively records the frames. Then, when generating a moving image file, the digital camera records information stating that the blurring correction has been performed in the header of the file, thereby preventing the blurring correction from being performed again when the moving image is played back. In addition, in the case that only the blurring detection is performed when shooting the moving image, the digital camera detects the blurring in the frame, correlates the detected blurring amount in the frame with the frame, and successively records the blurring amounts. Then, when generating the moving image file, the digital camera records information stating that the blurring detection has been performed in the header of the file.

17 Claims, 7 Drawing Sheets

MOVING IMAGE PLAYBACK DEVICE WITH CAMERA-SHAKE CORRECTION FUNCTION

CROSS-REFERENCE TO RELATED APPLICATION

This application is based upon and claims the benefit of priority from the prior Japanese Patent Application No. 2006-027567, filed 3 Feb. 2006, the entire contents of which are incorporated herein by reference.

BACKGROUND OF THE INVENTION

1. Field of the Invention

The present invention relates to a moving image playback device including a camera-shake correction function and a control method thereof.

2. Description of the Related Art

Conventionally, in a digital camera, for example, camera-shake (this concept includes hand shake and other similar situations) is corrected as follows. When shooting a moving image, the digital camera detects the amount of camera-shake using a gyro-sensor. When playing back the moving image, the digital camera detects the amount of blurring (motion vector) in image data using a representative point matching method or a block matching method. The digital camera trims a portion of the image based on the detected amount of blurring, thereby correcting the camera-shake.

In addition, a following technology has been developed. When the moving image is being shot, the moving image is recorded without the camera-shake correction causing loss of a portion of the image being performed. When the moving image is played back, the user selects whether to correct the camera-shake. If the camera-shake is to be corrected, the camera-shake correction is performed on the recorded moving image data, and the moving image is displayed. As a result, a moving image that is faithful to the original image can be recorded, without a portion of the picked-up moving image data becoming lost during the recording (for example, refer to Japanese Laid-Open (Kokai) Patent Publication No. Heisei 06-6669).

However, when the amount of camera-shake is detected through image processing, the amount of calculation required is large and power consumption is significant. Therefore, when the camera-shake correction is performed again on a moving image to which the camera-shake correction has already been performed during shooting or on a moving image that has no camera-shake in the first place, unnecessary power is consumed and batteries are quickly wasted.

SUMMARY OF THE INVENTION

The present invention has been achieved in light of the above-described issues.

In accordance with an aspect of the present invention, there is provided a moving image playback device including: a moving image playback means for playing back and displaying recorded moving image data; a first blurring correcting means for performing blurring correction on the recorded moving image data; a first judging means for judging whether the moving image data to be played back by the moving image playback means is recorded in a state requiring the blurring correction performed by the first blurring correcting means; and a playback controlling means for playing back and displaying the moving image data while the first blurring correcting means performs the blurring correction, when the moving image data to be played back by the moving image playback means is played back, in the case that the first judgment means judges that the moving image data is recorded in a state requiring blurring correction.

In accordance with another aspect of the present invention, there is provided a control method of a moving image playback device, comprising: a moving image playback step for playing back and displaying recorded moving image data; a blurring correcting step for performing blurring correction on the recorded moving image data; a judging step for judging whether the moving image data to be played back at the moving image playback step is recorded in a state requiring the blurring correction performed at the blurring correcting step; and a playback controlling step for playing back and displaying the moving image data while the blurring correction is performed at the blurring correcting step, when the moving image data to be played back at the moving image playback step is played back, in the case that the moving image data is judged to be recorded in a state requiring blurring correction at the judging step.

In accordance with still another aspect of the present invention, there is provided a program stored on a computer-readable medium executed by a computer in a moving image playback device, comprising: a moving image playback process for playing back and displaying recorded moving image data; a blurring correcting process for performing blurring correction by the recorded moving image data; a judging process for judging whether the moving image data to be played back by the moving image playback process is recorded in a state requiring the blurring correction performed by the blurring correcting process; and a playback controlling process for playing back and displaying the moving image data while the blurring correction is performed by the blurring correcting process, when the moving image data to be played back by the moving image playback process is played back, in the case that the moving image data is judged to be recorded in a state requiring blurring correction by the judging process.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. Configuration of the Digital Camera

Figure 1:
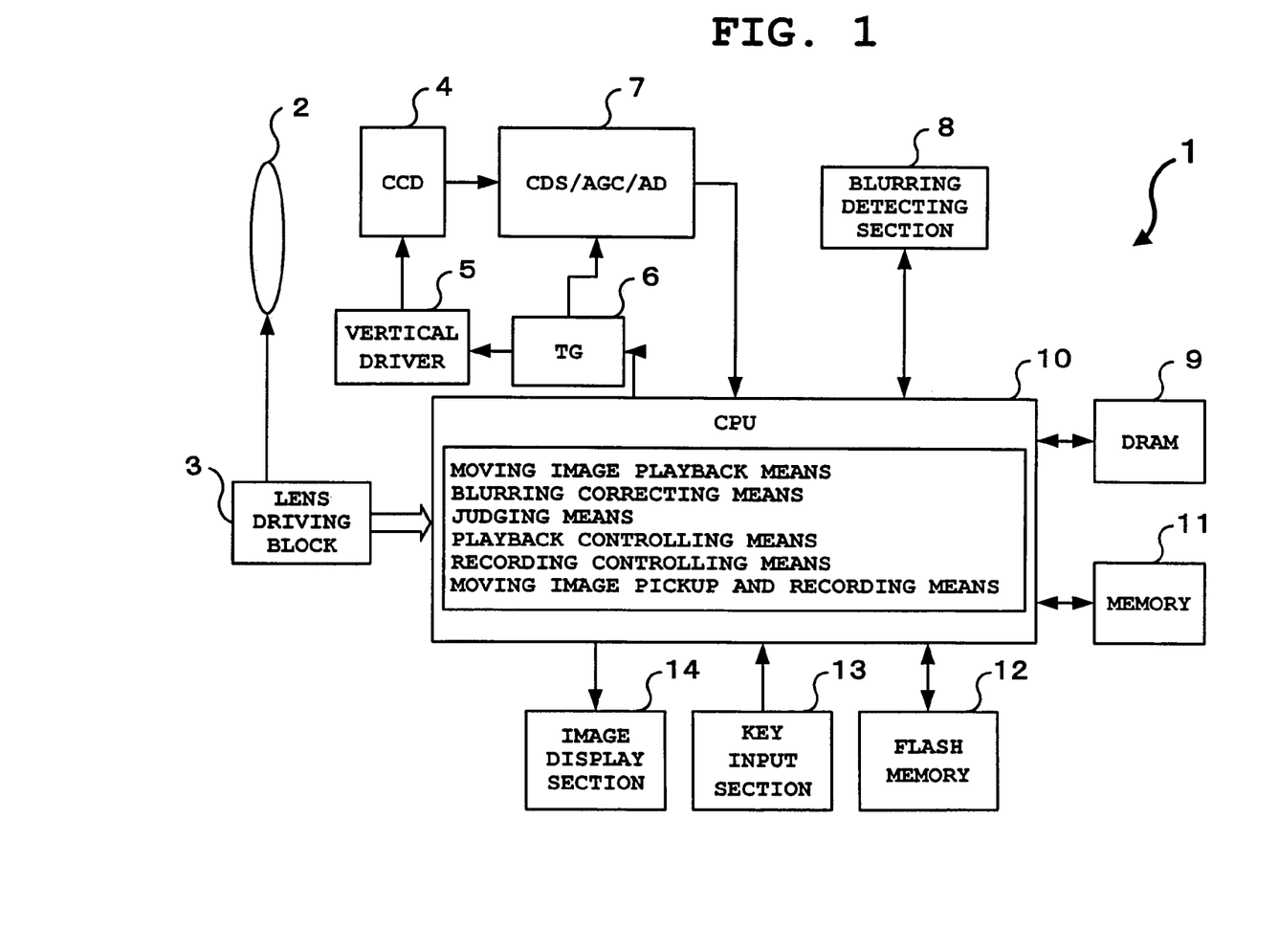
FIG. 1 is a block diagram of a digital camera according to an embodiment of the present invention.

FIG. 1 is a block diagram of an electrical schematic of a digital camera 1 that actualizes a moving image playback device of the present invention.

The digital camera 1 includes an imaging lens 2, a lens driving block 3, a charge-coupled device (CCD) 4, a vertical driver 5, a timing generator 6, a unit circuit 7, a blurring detecting section 8, a dynamic random access memory (DRAM) 9, a central processing unit (CPU) 10, a memory 11, a flash memory 12, a key input section 13, and an image display section 14.

The imaging lens 2 includes a focus lens and a zoom lens (not shown) and is connected to the lens driving block 3. The lens driving block 3 includes a motor, a focus motor driver, and a zoom motor driver. The motor respectively drives the focus lens and the zoom lens (not shown) in an optical axis direction. The focus motor driver and the zoom motor driver respectively drive the focus motor and the zoom motor in the optical axis direction, in adherence to a control signal from the CPU 10.

The vertical driver 5 scan-drives the CCD 4. The CCD 4 photo-electrically converts the light intensity of the respective colors in the RGB value of a subject image at a constant cycle and outputs the light intensity to the unit circuit 7 as an imaging signal (image data). The CPU 10 controls the operation timings of the vertical driver 6 and the unit circuit 7, via the TG 6.

The TG 6 is connected to the unit circuit 7. The unit circuit 7 includes a correlated double sampling (CDS) circuit, an automatic gain control (AGC) circuit, and an analog-to-digital (A/D) converter. The CDS circuit performs correlated double sampling on the imaging signal outputted from the CCD 4 and holds the sampled imaging signal. The AGC circuit performs automatic gain control on the sampled imaging signal. The A/D converter converts the automatic-gain-controlled analog imaging signal to a digital signal. The imaging signal from the CCD 4 is sent to the CPU 10 as the digital signal, via the unit circuit 7.

The blurring detecting section 8 detects the camera-shake and the blurring of the subject included in recorded moving image data and picked-up moving image data. In the blurring detection, the amount of blurring (motion vector) in image data of a frame is detected by a representative point matching method or a block matching method. When the amount of blurring (motion vector) is detected using the representative point matching method or the block matching method, the motion vector is detected using the image data of the frame on which the detection is performed and the image data of the previous frame.

Here, although the amount of blurring (motion vector) in the frame is detected using the representative point matching method or the block matching method, the detection is not limited to these methods. Any method can be used as long as the amount of blurring included in the recorded moving image data or the picked-up moving image data can be detected.

Although the blurring detection is performed using hardware, the blurring detection can be realized through processing using software (image processing). In addition, when the moving image is being shot, the blurring detection can be performed by an external blurring detection sensor, such as a gyro sensor.

The DRAM 9 is used as a buffer memory temporarily storing the image data sent to the CPU 10 after being picked up by the CCD 4. The DRAM 9 is also used as a working memory of the CPU 10.

The flash memory 12 is a recording medium used to record the image data picked up by the CCD4 and the like.

The CPU 10 is a one-chip microcomputer having functions that perform image processing (interpolation processing, gamma (γ) correction processing, luminosity color-difference signal generation, white balance processing, exposure compensation processing, etc.), compression and expansion processing (compression and expansion in a joint photographic experts group (JPEG) format or a moving picture experts group (MPEG) format, etc.), and the like on the image data sent from the unit circuit 7. The CPU 10 also controls each section of the digital camera 1.

The memory 11 stores a control program required to control each section of the CPU 10 and necessary data. The CPU 10 operates in accordance with the program. Therefore, the CPU 10 realizes functions of a moving image playback means for playing back and displaying recorded moving image data; a blurring correcting means for performing blurring correction; a judging means for judging whether the moving image data is recorded in a state requiring the blurring correction; a playback controlling means for playing back and displaying the moving image data while the blurring correcting means performs the blurring correction, in the case that the moving image data is recorded in a state requiring blurring correction; a recording controlling means for recording the moving image data to which the blurring correction has been performed and attaching information stating that the blurring correction has been performed to the moving image data; and a moving image pickup and recording means for continuously imaging a subject and recording the image as moving image data.

The key input section 13 includes a plurality of operation keys, such as a mode key, a shutter button, a cross key, a SET key, and a zoom key ("W" key and "T" key). The key input section 13 outputs operation signals to the CPU 10 depending on the key operations performed by the user.

The image display section 14 includes a color liquid crystal display (LCD) and a driver circuit for the color LCD. In stand-by mode, the image display section 14 displays the subject picked up by the CCD 4 as a through image. When playing back a recorded image, the image display section 14 displays the recorded image read out from the flash memory 12.

B. Operations of the Digital Camera

Operations performed by the digital camera 1 according to the present embodiment will be described. The operations are divided into when the digital camera 1 is shooting a moving image and when the digital camera is playing back a moving image.

B-1. When Shooting a Moving Image

First, an operation performed by the digital camera 1 according to the embodiment when shooting a moving image will be described with reference to the flowchart in FIG. 2.

When moving image shooting mode is selected, the CPU 10 starts imaging a subject using the CCD 4 and generates a luminosity color-difference signal from the image data acquired through imaging. The CPU 10 stores the image data of the generated luminosity color-difference signal in the buffer memory (DRAM 9) and starts a through image display (Step S1). In the through image display, the stored image data of the subject is displayed in the image display section 14.

Next, the CPU 10 sets whether there is a blurring correction process and whether there is a blurring detection process. In other words, the CPU 10 sets whether to perform the blurring correction process and whether to perform the blurring detection process (Step S2).

At this time, the user can select whether to perform the blurring correction process and whether to perform the blurring detection process by operating the key input section 13. The CPU 10 sets whether there is a blurring correction process and whether there is a blurring detection process based on the selection.

If the user selects to perform the blurring correction process when the moving image is being shot and recorded, the user cannot select to not perform the blurring detection since the blurring detection is obviously required to be performed to perform the blurring correction. In other words, when only the blurring detection is selected, only the blurring detection is performed.

Next, the CPU 10 judges whether the user has given an instruction to shoot a moving image (Step S3). Here, the CPU 10 judges whether an operation signal corresponding to the user pressing the shutter button is sent from the key input section 13.

When judged at Step S3 that the instruction to shoot the moving image has not been given, the CPU 10 returns to Step S2. In other words, whether there is a blurring correction process and whether there is a blurring detection process can be freely changed until the user gives the instruction to shoot the moving image.

When judged at Step S3 that the instruction to shoot a moving image has been given, the CPU 10 judges whether the setting that there is a blurring correction process has been made at Step S2. (Step S4).

When judged at Step S4 that the setting that there is a blurring correction process has been made and that the blurring correction will be performed, the CPU 10 acquires image data of a first frame imaged by the CCD 4 (Step S5). The image data of the first frame refers to the image data of a frame first imaged after the instruction to shoot the moving image has been given. At this time, the CPU 10 outputs the acquired image data of the first frame to the blurring detecting section 8.

Next, the CPU 10 trims image data from the acquired image data of the first frame based on predetermined trimming position and trimming size (generates trimmed image data). The CPU 10 also compresses the trimmed image data and records the compressed image data in the flash memory 12 (Step S6). At this time, it goes without saying that the CPU 10 performs image processing, such as luminosity color-difference signal generation, in addition to generating the trimmed image data before recording the compressed image data in the flash memory 12.

Next, the CPU 10 acquires image data of a new frame that has been imaged next (Step S7). At this time, the CPU 10 outputs the acquired image data to the blurring detecting section 8.

Next, the CPU 10 uses the blurring detecting section 8 to perform a blurring detection process on the outputted image data of the new frame (Step S8). The CPU 10 acquires a detection process result (blurring amount) from the blurring detecting section 8. At this time, the blurring detecting section 8 detects the blurring amount (motion vector) in the sent image data of the new frame, based on the sent image data of the new frame and the image data of the previous frame.

Next, the CPU 10 decides a new trimming position based on the detected blurring amount (motion vector) and the previous trimming position. Then, the CPU 10 generates a trimmed image from the acquired image data of the new frame, based on the newly decided trimming position and the predetermined trimming size (Step S9) and outputs the trimmed image to the CPU 10. The blurring correction is performed by this trimming. At this time, it goes without saying that the CPU 10 performs image processing, such as luminosity color-difference signal generation, in addition to generating the trimmed image data.

Next, the CPU 10 compresses the generated trimmed image data and records the compressed trimmed image data in the flash memory 12 (Step S10). When recording the trimmed image data, the CPU 10 can enlarge or reduce the image size of the trimmed image data to the moving image pickup size and record the enlarged or reduced trimmed image data.

Next, the CPU 10 judges whether the user has given an instruction to complete shooting (Step S11). Here, the CPU 10 judges whether the operation signal corresponding to the user pressing the shutter button is sent from the key input section 13.

When judged at Step 11 that the instruction to complete shooting has not been given, the CPU 10 returns to Step S7. When judged at Step S11 that the instruction to complete shooting has been given, the CPU 10 proceeds to Step 12 and generates a moving image file from a plurality of image data recorded in advance. At this time, information stating that the blurring correction process has been performed is recorded in the header of the moving image file.

At the same time, when judged at Step S4 that the setting that there is no blurring correction process has been made, the CPU 10 judges whether the setting that there is the blurring detection process has been made (Step S13).

When judged at Step S13 that the setting that there is the blurring detection has been made, the CPU 10 acquires the image data of the first frame imaged by the CCD 4. The CPU 10 performs image processing on the acquired imaged data and records the image data in the flash memory 12 (Step S14). At this time, the CPU 10 performs a process to output the acquired image data of the first frame to the blurring detecting section 8.

Next, the CPU 10 acquires the image data of a new frame that has been picked up next (Step S15). At this time, the CPU 10 outputs the newly acquired image data to the blurring detecting section 8.

Next, the CPU 10 uses the blurring detecting section 8 to perform the blurring detection process on the outputted new image data of the frame (Step S16) and acquires the detection process result (blurring amount) from the blurring detecting unit 8.

Next, the CPU 10 performs image processing on the newly acquired image data of the frame and records the image data in the flash memory 12. In addition, the CPU 10 correlates the blurring amount acquired from the blurring detecting section 8 with the image data and records the blurring amount (Step S17).

Next, the CPU 10 judges whether the user has given the instruction to complete shooting (Step S18).

When judged at Step S18 that the instruction to complete shooting has not been given, the CPU 10 returns to Step 15. When judged at Step S18 that the instruction to complete shooting has been given, the CPU 10 proceeds to Step S19 and generates the moving image file from the plurality of image data recorded in advance. At this time, the information stating that the blurring detection process has been performed is recorded in the header of the moving image file.

When judged at Step S4 that the setting that there is no blurring detection process has been made, the CPU 10 proceeds to Step S20 and performs an ordinary moving image shooting and recording process. In other words, the CPU 10 successively acquires image data of frames picked up by the CCD 4 at a constant cycle. Then, the CPU 10 successively performs image processing on the acquired image data of the frames and performs a process to record the image data in the flash memory 12.

Next, the CPU 10 judges whether the user has given the instruction to complete shooting (Step S21). When judged that the instruction to complete shooting has not been given, the CPU 10 performs the ordinary moving image shooting and recording process until the instruction to complete the shooting is given (Step S20 to Step S21). When judged that the instruction to complete the shooting has been given, the CPU 10 generates the moving image file from the plurality of recorded image data (Step S22).

B-2. When Playing Back a Moving Image

Next, an operation performed by the digital camera 1 according to the embodiment when playing back a moving image will be described with reference to the flowcharts in FIG. 3 and FIG. 4.

In moving image playback mode, the CPU 10 designates a moving image file selected by the user from among the moving image files recorded in the flash memory 12 (Step S31).

At this time, when the digital camera 1 is set to the moving image playback mode, the CPU 10 lists the moving image files recorded in the flash memory 12 by displaying thumbnail images or moving image file names. The user can select the moving image file to be played back from the listed moving image files by operating the cross key and the SET key.

When the moving image file is designated, the CPU 10 judges whether the blurring correction has been performed on the moving image data in the designated moving image file (Step S32). Namely, the CPU 10 judges whether the information that the blurring correction process has been performed is attached to the header of the moving image file.

When judged at Step S32 that the blurring correction has been performed, the CPU 10 judges whether the user has given an instruction to play back the moving image (Step S33). When judged that the instruction has not been given, the CPU 16 remains at Step S33. When judged that the instruction has been given, the CPU 10 proceeds to Step S37.

At the same time, when judged that the blurring correction has not been performed at Step S32, the CPU 10 performs settings for whether there is the blurring correction process and the saving method (Step S34). There are three saving methods: "save as new file", "overwrite", and "do not save".

At this time, the user can select whether to perform the blurring correction and the saving method by operating the key input section 13. The CPU 10 sets whether there is a blurring correction process and the saving method in adherence to the selections.

When the user selects that there is no blurring correction, "do not save" is automatically selected. When there is no blurring correction, the designated moving image file is simply played back. Therefore, there is no need to save the moving image file as a new file or overwrite the file.

Next, the CPU 10 judges whether the user has given an instruction to play back the moving image (Step 35).

When judged at Step S35 that the instruction to play back the moving image has not been given, the CPU 10 returns to Step S34. In other words, the settings for whether there is a blurring correction process and the saving method can be changed until the user gives the instruction to play back the moving image.

When judged at Step S35 that the instruction to play back the moving image has been given, the CPU 10 judges whether the setting that there is a blurring correction process has been made at Step S34 (Step S36).

When judged at Step S36 that the setting that there is a blurring correction process has not been made, the CPU 10 proceeds to Step S37.

At Step S37, the CPU 10 performs an ordinary moving image playback process. In other words, the CPU 10 reads the moving image data of the designated moving image file from the flash memory 12 and displays the frames of the read moving image file in the image display section 14. The frames are sequentially displayed from the first frame.

At the same time, when judged at Step S36 that the setting that there is a blurring correction process has been made, the CPU 10 reads data of the designated moving image file from the flash memory 12, stores the read data in the buffer memory, and acquires the image data of the first frame from the buffer memory (Step S38). At this time, the CPU 10 outputs the acquired image data of the first frame to the blurring detecting section 8.

Next, the CPU 10 trims image data from the acquired image data of the first frame based on the predetermined trimming position and trimming size (generates trimmed image data) and displays the trimmed image data in the image display section 14 (Step S39).

At this time, when the saving method is set to "save as new file", the CPU 10 records the displayed trimmed image data in the flash memory 12. When the saving method is set to "overwrite", the CPU 10 overwrites the flash memory 12 with the displayed trimmed image data. In other words, when the storing method is set to "overwrite", the displayed trimmed image data is recorded over the image data of the first frame in the designated moving image file. When recording the trimmed image data, the CPU 10 can enlarge or reduce the image size of the trimmed image data to the moving image shooting size and record the enlarged or reduced trimmed image data.

Next, the CPU 10 newly acquires image data of the next frame from the buffer memory (Step S40). At this time, the CPU 10 outputs the newly acquired image data of the frame to the blurring detecting section 8.

Then, the CPU 10 judges whether the blurring amount in the newly acquired image data of the frame has already been detected (Step S41). Namely, the CPU 10 judges whether the blurring amount is correlated with the acquired image data of the frame and recorded.

The CPU 10 can judge whether the information stating that the blurring detection has been performed is recorded in the header of the moving image file designated by the user. In this case, the CPU 10 can judge whether the blurring amount has been detected by moving image files, without judging whether the blurring amount has been detected by frames.

When judged at Step S41 that the blurring amount has not been detected, the CPU 10 uses the blurring detecting section 8 to perform the blurring detection process on the outputted new image data of the frame (Step S42) and proceeds to Step S43. At this time, the CPU 10 acquires the detection process result (blurring amount) from the blurring detecting section 8.

At the same time, when judged at Step S41 that the blurring amount has been detected, the CPU 10 proceeds directly to Step S43. At this time, when judged that the blurring amount has been detected, the CPU 10 acquires the blurring amount correlated with the frame and recorded.

When the CPU 10 proceeds to Step S43, the CPU 10 decides a new trimming position depending on the blurring amount (motion vector) in the newly acquired image data of the frame and the previous trimming position. Then, the CPU 10 generates the trimmed image data from the newly acquired image data of the frame based on the newly decided trimming position and the predetermined trimming size.

When judged at Step S41 that the blurring detection has been performed, the blurring amount in the acquired image data of the frame is the blurring amount correlated with the frame and recorded. When judged at Step S41 that the blurring detection has not been performed, the blurring amount in the acquired image data of the frame refers to the blurring amount detected at Step S42.

It goes without saying that the CPU 10 performs image processing when generating the trimmed image data.

Next, the CPU 10 displays the generated trimmed image data in the image display section 14 (Step S44).

Then, the CPU 10 judges whether to save the displayed image data (Step S45). Namely, the CPU 10 judges that the image data will be saved when the saving method is set to "save as new file" or "overwrite". The CPU 10 judges that the image data will not be saved when the saving method is set to "do not save".

When judged at Step S45 that the image data will not be saved, the CPU 10 judges whether the moving image playback is completed (Step S46). When judged that the moving image playback is not completed, the CPU 10 returns to Step S40. The CPU 10 judges whether the moving image playback is completed by judging whether the image data of all frames have been displayed (specifically, trimmed and displayed). The CPU 10 can also be configured to judge that the moving image is completed when the user performs a moving image playback completion operation by operating the key input section 13.

At the same time, when judged at Step S45 that the image data will be saved, the CPU 10 judges whether to save the image data as a new file (Step S47). Namely, the CPU 10 judges whether the saving method is set to "save as new file" at Step S34.

When judged at Step S47 that the image data is saved as a new file, the CPU 10 compresses the displayed trimmed image data and records the compressed image data (Step S48). Then, the CPU 10 judges whether the moving image playback is completed (Step S49).

When recording the trimmed image data, the CPU 10 can enlarge or reduce the image size of the trimmed image data to the moving image shooting size and record the enlarged or reduced trimmed image data.

When judged at Step S49 that the moving image playback is not completed, the CPU 10 returns to Step S40. When judged that the moving image playback is completed, the CPU 10 proceeds to Step S50 and generates the moving image file from the plurality of trimmed image data recorded in advance. At this time, the information stating that the blurring correction has been performed is recorded in the header of the moving image file.

At the same time, when judged at Step S47 that the image data is not saved as a new file or, in other words, the image data overwrites data, the CPU 10 overwrites the flash memory 12 with the displayed image data (trimmed image data) and records the image data. In other words, when the saving method is set to "overwrite", the trimmed image data is recorded over the image data of the frame that is the source from which the trimmed image data has been generated. When overwriting the image data with the trimmed image data, the CPU 10 can enlarge or reduce the image size of the trimmed image data to the moving image shooting size and record the enlarged or reduced trimmed image data.

Next, the CPU 10 judges whether the moving image playback is completed (Step S52).

When judged at Step S52 that the moving image playback is not completed, the CPU 10 returns to Step S40. When judged that the moving image playback is completed, the CPU 10 proceeds to Step S53 and records the information stating that the blurring correction processing has been performed in the header of the moving image file of which the image data has been overwritten and recorded.

C. Effects

As described above, according to the embodiment, when the blurring correction is performed when the moving image is shot, the information stating that the blurring correction has been performed is also recorded in the header of the moving image file. Therefore, the blurring correction is not required to be performed again when the moving image data is being played back. Moreover, power is not needlessly consumed, and unnecessary processes are not performed.

When the blurring detection is performed when the moving image is shot, the frame image data and the blurring amount in the frame are correlated and the blurring amount is recorded. Therefore, the blurring is not required to be detected again when the moving image data is being played back. Moreover, power is not needlessly consumed, and unnecessary processes are not performed.

When the moving image is being played back, whether the information stating that the blurring correction has been performed is in the header of the moving image file is judged. In some instances, the moving image is played back without the blurring correction or the blurring detection being performed. Therefore, power is not needlessly consumed and unnecessary processes are not performed.

When the blurring correction is judged to be performed when the moving image is being played back, whether the blurring amount is correlated with the frame and recorded is judged. When the blurring amount is correlated and recorded, the blurring correction is performed using the correlated and recorded blurring amount. Therefore, the blurring amount is not needlessly detected, power is not needlessly consumed, and unnecessary processes are not performed.

When the saving setting ("save as new file" or "overwrite") is made and the blurring correction is performed when the moving image is being played back, the information stating that the blurring correction has been performed is recorded in the header when the moving image file of the blurring-corrected moving image data is recorded. Therefore, the blurring correction is not performed again on the moving image data to which the blurring correction has been performed once before. Moreover, power is not needlessly consumed, and unnecessary processes are not performed.

D. Variation Example 1

The following variation example is possible according to the above embodiment.

According to the embodiment, the user selects whether to perform the blurring correction when the moving image is being played back. However, in the variation example 1, whether the blurring correction is required is automatically judged based on the moving image data of the moving image file.

Figure 5:
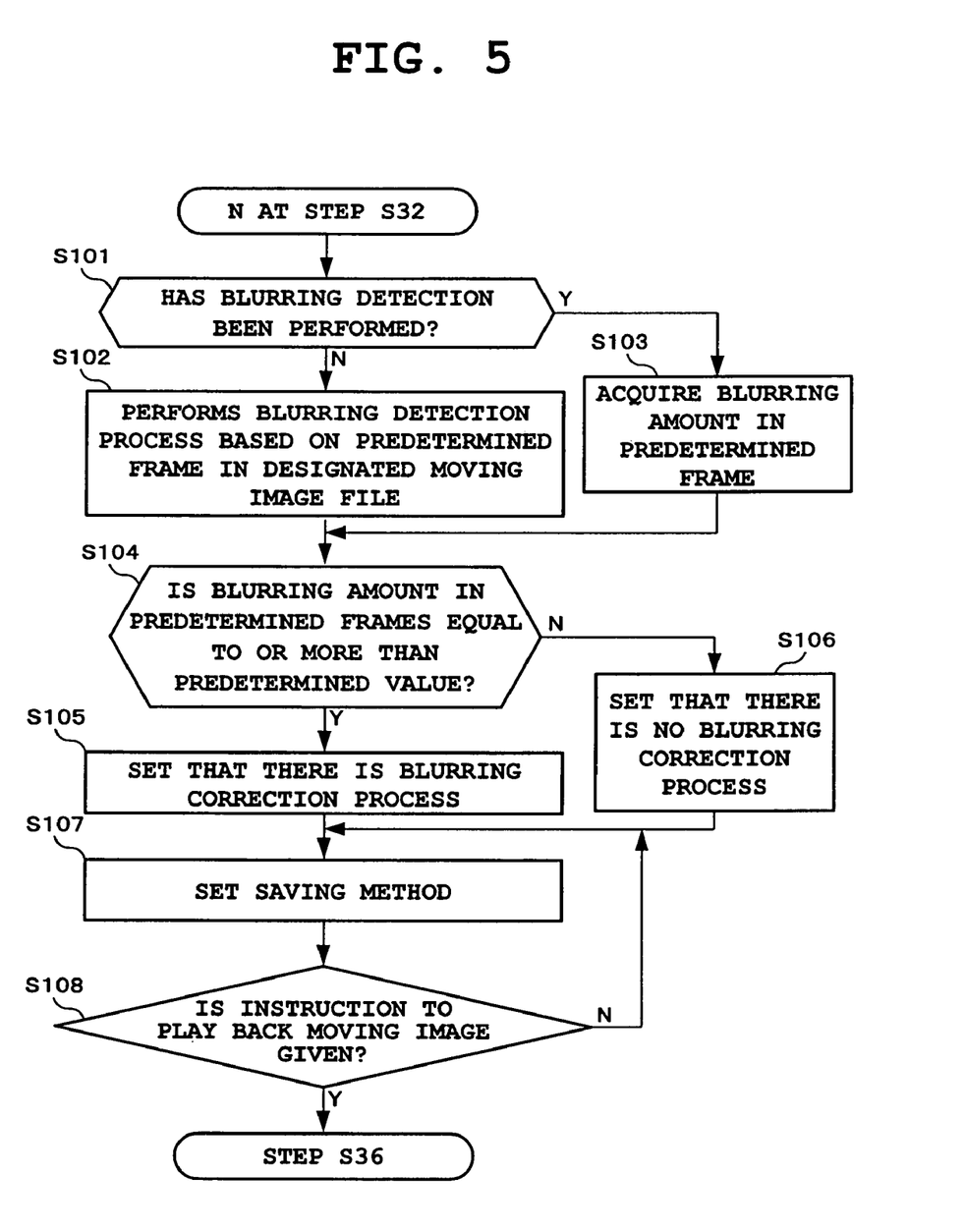
FIG. 5 is a flowchart of an operation performed by a digital camera in a variation example 1.

Hereafter, an operation of the digital camera 1 in the variation example 1 will be described with reference to the flowchart in FIG. 5.

Figure 3:
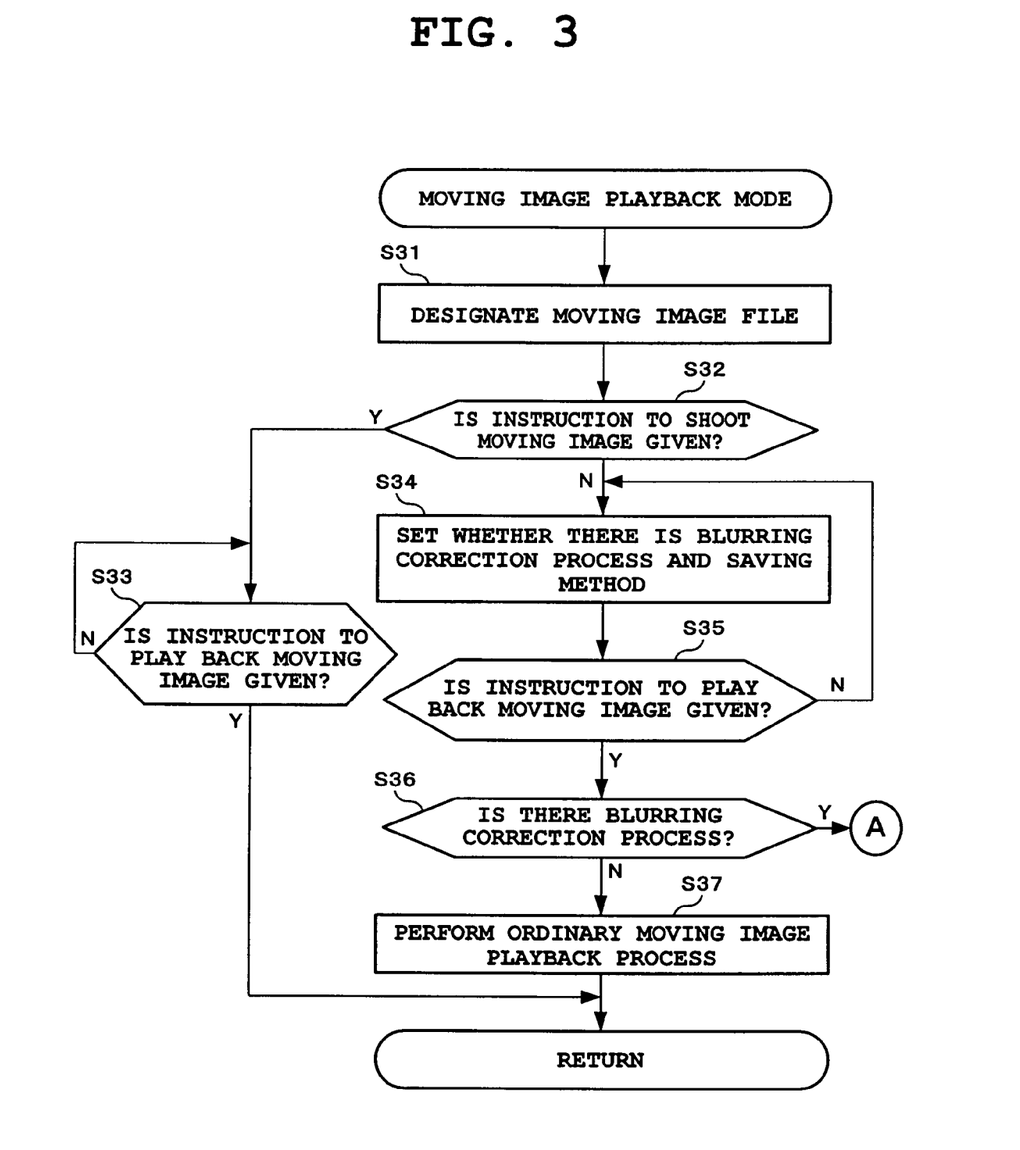
FIG. 3 is a flowchart of an operation performed during playback, according to the embodiment.

When judged at Step S32 in FIG. 3 that the blurring correction has not been performed, the CPU 10 proceeds to Step S101 and judges whether the blurring detection has been performed on the designated moving image file. Namely, the CPU 10 judges whether the information stating that the blurring detection has been performed is recorded in the header of the moving image file.

When judged at Step S101 that the blurring detection has not been performed, the CPU 10 detects the blurring amount in predetermined frames (for example, 2nd to 10th frames) of the designated moving image file (Step S102) and proceeds to Step S104.

Specifically, the CPU 10 reads image data (image data of the 1st frame to the 10th frame) required to perform the blurring detection on the predetermined frames from the flash memory 12, from among the designated moving image file data. The CPU 10 stores the image data in the buffer memory and outputs the stored image data to the blurring detecting section 8, thereby using the blurring detecting section 8 to detect the blurring amount in the predetermined frame. Then, when the blurring amount in the predetermined frame is detected, the blurring detecting section 8 outputs the result to the CPU 10.

Here, the predetermined frames are the first several frames. However, the predetermined frames are not limited thereto and may be frames with a predetermined interval therebetween or may be randomly decided. For example, if the predetermined interval is 10 frames and the first predetermined frame is the 2nd frame, the predetermined frames are the 2nd, 22nd, 32nd, etc., frames. When the predetermined frames are randomly decided, the predetermined frames are the 3rd, 10th, 13th, 18th, etc., frames or the like.

At the same time, when judged at Step S101 that the blurring amount detection has been performed, the CPU 10 acquires the blurring amount in the predetermined frames (Step S103) and proceeds to Step S104.

Specifically, the CPU 10 reads the blurring amount correlated with the predetermined frames in the designated moving image file and recorded from the flash memory 12 and acquires the blurring amount.

At Step S104, the CPU 10 judges whether the acquired blurring amount in the predetermined frames is equal to or more than a predetermined value.

When judged that the blurring amount in the predetermined frames is equal to or more than the predetermined value, the CPU 10 judges that the blurring correction is required to be performed since the blurring amount is large. The CPU 10 sets that there is a blurring correction process (Step S105) and proceeds to Step S107.

The judgment method used to judge whether the blurring amount in the predetermined frames is equal to or more than the predetermined value can be judging whether the total blurring amount (or mean blurring amount) in the predetermined frames is equal to or more than the predetermined value. Alternatively, the judgment method can be judging whether the largest or the smallest blurring amount in the predetermined frames is equal to or more than the predetermined value. Other methods can also be used.

At the same time, when judged that the blurring amount in the predetermined frames is not equal to or more than the predetermined value, the CPU 10 judges that the blurring correction is unnecessary since the blurring amount is small. The CPU 10 sets that there is no blurring correction process (Step 106) and proceeds to Step S107.

At Step S107, the CPU 10 sets the saving method in adherence to the saving method selected by the user. There are three saving methods: "save as new file", "overwrite", and "do not save". However, when judged at Step S106 that there is no blurring correction process, the CPU 10 automatically selects "do not save".

Next, the CPU 10 judges whether the user has given the instruction to play back the moving image (Step S108). When the instruction to play back the moving image has not been given, the CPU 10 returns to Step S107. When the instruction to play back the moving image has been given, the CPU 10 proceeds to Step S36 in FIG. 3.

As a result, whether the moving image data requires the blurring correction is automatically judged. The blurring correction is not performed on moving image data that does not require blurring correction. Therefore, power is not needlessly consumed, and unnecessary processes are not performed.

E. Variation Example 2

The following variation example is possible according to the above embodiment.

According to the embodiment, the user selects whether to perform the blurring correction before the moving image is played back. However, in the variation example 2, the blurring amount in the frames is detected when the moving image is being played back. When the blurring amount is large, the blurring correction is performed. When the blurring amount is small, the blurring correction is not performed.

Hereafter, an operation performed by the digital camera 1 in the variation example 2 will be described with reference to the flowchart in FIG. 6.

In moving image playback mode, the CPU 10 designates the moving image file selected by the user from among the moving image files recorded in the flash memory 12 (Step S151).

When the moving image file is designated, the CPU 10 judges whether the blurring correction has been performed on the moving image data of the designated moving image file (Step S152). Namely, the CPU 10 judges whether the information stating that the blurring correction process has been performed is attached to the header of the moving image file.

When judged at Step S152 that the blurring correction has been performed, the CPU 10 proceeds to Step S33 in FIG. 3. When judged that the blurring correction has not been performed, the CPU 10 sets the saving method (Step S153).

Next, the CPU 10 judges whether the user has given the instruction to play back the moving image (Step S154).

When judged at Step S154 that the instruction to play back the moving image has not been given, the CPU 10 returns to Step S153. When judged that the instruction to play back the moving image has been given, the CPU 10 starts a blurring correction judgment process. The blurring correction judgment process refers to a process for judging whether the blurring correction is to be performed. The blurring correction judgment process will be described hereafter.

Next, the CPU 10 reads the data of the designated moving image file from the flash memory 12 and stores the data in the buffer memory. The CPU 10 reads the image data of the first frame from the buffer memory and displays the image data in the image display section 14. At this time, the CPU 10 generates the trimming data based on the predetermined trimming position and trimming size and displays the generated trimmed image data.

In addition, at this time, when the saving method is set to "save as new file", the CPU 10 records the displayed image data in the flash memory 12. When the saving method is set to "overwrite", the flash memory 12 is overwritten with the displayed trimmed image data and the displayed image data is recorded.

Next, the CPU 10 newly acquires image data of the next frame (Step S157) and judges whether the blurring correction is set to ON (Step S158). The ON and OFF setting of the blurring correction is made through the blurring correction judgment process.

When judged at Step S158 that the blurring correction is set to ON, the CPU 10 performs the blurring correction process based on the blurring amount in the newly acquired frame and proceeds to Step S160. The blurring detecting section 8 detects the blurring amount. When judged that the blurring correction is not set to ON, the CPU 10 proceeds directly to Step S160.

Specifically, when the blurring correction is set to ON, the CPU 10 performs the blurring correction by deciding a new trimming position based on the motion vector of the frame and the previous trimming position. When the blurring correction is set to OFF, the CPU 10 generates the trimmed image data based on the previous trimming position and the predetermined trimming size. In this case, the blurring correction is not performed.

At Step S160, the CPU 10 displays the trimmed image data.

Next, the CPU 10 judges whether to save the displayed image data (Step S161). When judged that the image data will not be saved, the CPU 10 judges whether the playback is completed (Step S162). When judged that the playback is not completed, the CPU 10 returns to Step S157.

At the same time, when judged at Step S161 that the image data will be saved, the CPU 10 judges whether the image data is saved as a new file (Step S163).

When judged at Step S161 that the image data is saved as a new file, the CPU 10 compresses the displayed trimmed image data and records the compressed image data (Step S164). Then, the CPU 10 judges whether the moving image playback is completed (Step S165).

When judged at Step S165 that the moving image playback is not completed, the CPU 10 returns to Step S157. When judged that the moving image playback is completed, the CPU 10 proceeds to Step S166 and generates the moving image file from the plurality of trimmed image data recorded in advance.

At the same time, when judged at Step S163 that the image data is not stored as a new file or, in other words, the image data overwrites data, the CPU 10 overwrites the flash memory 12 with the displayed image data and records the image data (Step S167).

Next, the CPU 10 judges whether the moving image playback is completed (Step S168). When judged that the moving image playback is not completed, the CPU 10 returns to Step S157.

As a result, the blurring correction is performed only on frames requiring blurring correction. Therefore, power is not needlessly consumed, and unnecessary processes are not performed.

Figure 7:
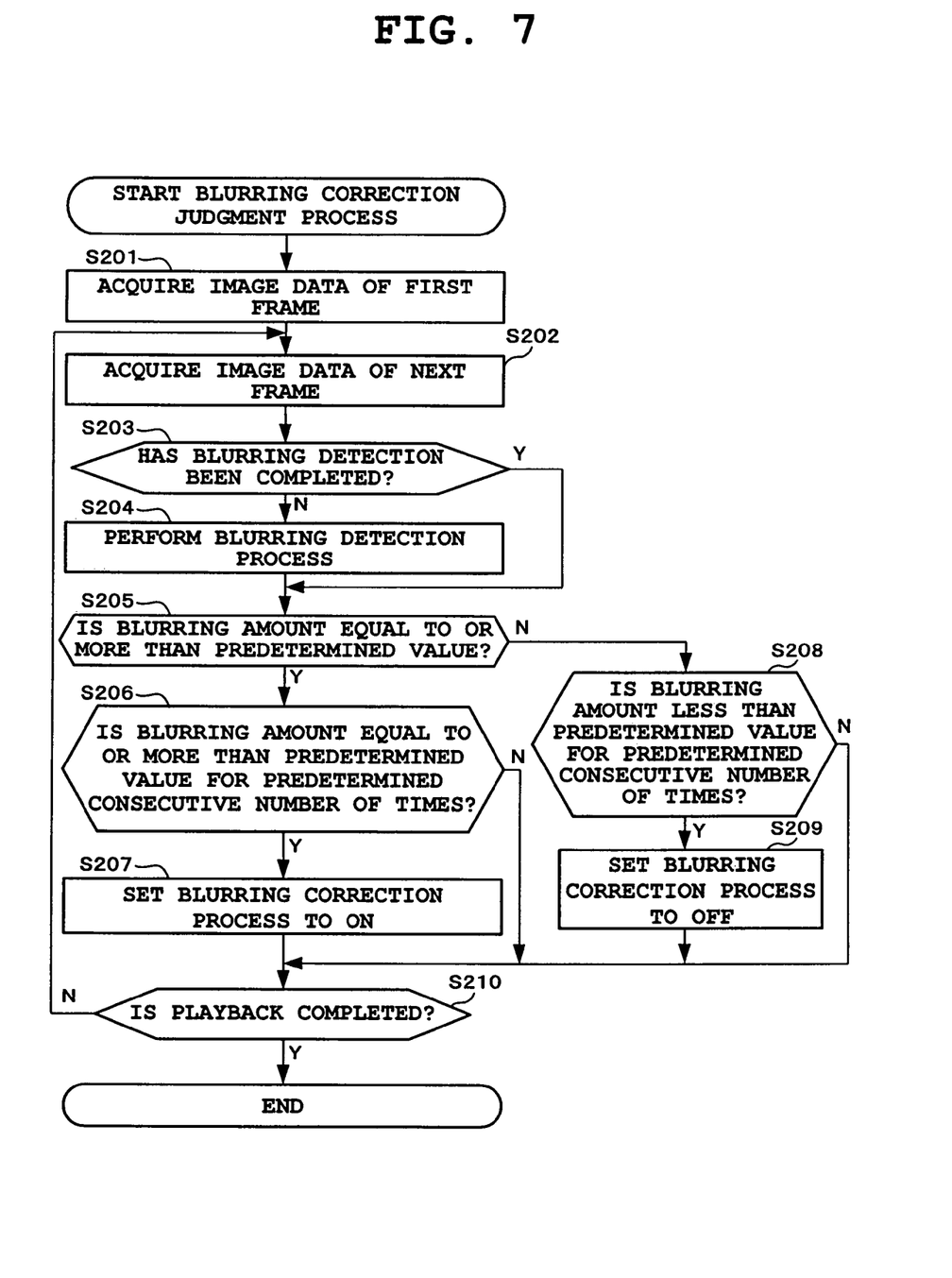
FIG. 7 is a flowchart of an operation performed by the digital camera in the variation example 2.

Next, an operation of the blurring correction judgment process will be described with reference to the flowchart in FIG. 7.

When the blurring correction judgment process is started, the CPU 10 acquires the image data of the first frame from among the moving image data stored in the buffer memory (Step S201). At this time, the CPU 10 outputs the acquired image data of the frame to the blurring detecting section 8.

Next, the CPU 10 newly acquires the image data of the next frame from the buffer memory (Step 202). At this time, the CPU 10 outputs the acquired image data to the blurring detecting section 8.

Next, the CPU 10 judges whether the blurring amount in the newly acquired image data of the frame has already been detected (Step S203). Here, the CPU 10 can judge whether the blurring amount is correlated with the acquired image data of the frame and recorded. Alternatively, the CPU 10 can judge whether the information stating that the blurring detection has been performed is recorded in the header of the designated moving image file.

When judged at Step S203 that the blurring amount has not been detected, the CPU 10 uses the blurring detecting section 8 to perform the blurring detection process on the outputted new frame image data (Step S204) and proceeds to Step S205. At this time, the CPU 10 acquires the detection process result (blurring amount) from the blurring detecting section 8.

At the same time, when judged that the blurring amount has been detected at Step S203, the CPU 10 proceeds directly to Step S205. At this time, when judged that the blurring amount has been detected, the CPU acquires the blurring amount correlated with the frame and recorded.

Next, the CPU 10 judges whether the blurring amount in the newly acquired image data of the frame is equal to or more than the predetermined value (Step S205).

When judged at Step S205 that the blurring amount is equal to or more than the predetermined value, the CPU 10 judges whether the blurring amount is equal to or more than the predetermined value for a predetermined consecutive number of times (for example, three times) (Step S206).

When judged at Step S206 that the blurring amount is equal to or more than the predetermined value for the predetermined consecutive number of times, the CPU 10 sets the blurring correction process to ON (Step S207) and proceeds to Step S210. When judged that the blurring amount is not equal to or more than the predetermined value for the predetermined consecutive number of times, the CPU 10 proceeds directly to Step S210.

At the same time, when judged at Step S205 that the blurring amount in the newly acquired image data is less than the predetermined value, the CPU 10 judges whether the blurring amount is less than the predetermined value for a predetermined consecutive number of times (Step S208).

When judged at Step S208 that the blurring amount is lower than the predetermined value for the predetermined consecutive number of times, the CPU 10 sets the blurring correction process to OFF (Step S209) and proceeds to Step S210. When judged that the blurring amount is not lower than the predetermined value for the predetermined consecutive number of times, the CPU 10 proceeds directly to Step S210.

At Step S210, the CPU 10 judges whether the moving image playback is completed. When judged that the moving image playback is not completed, the CPU 10 returns to Step S202.

In the variation example 2, the blurring detection process is performed on all frames. However, the blurring detection process can be performed periodically (for example, at every predetermined number of frames). When the blurring correction process is ON, the interval between frames to which the blurring detection is performed can be shortened. When the blurring correction process is OFF, the interval between frames to which the blurring detection is performed can be lengthened.

F. Variation Example 3

The present invention can be further actualized by the following variation example, according to the above embodiment and variation examples 1 and 2.

(1) According to the above embodiment and the variation examples 1 and 2, the blurring detecting section 8 detects the blurring amount in all image data of the frame. However, the blurring amount can be detected based on the image data in an area to be trimmed, among all image data in the frame.

The area to be trimmed within the frame is decided after the motion vector of the frame is detected. Therefore, the image data in the area to be trimmed of which the motion vector is detected refers to the image data in a previously trimmed area or an area depending on the predetermined trimming position and trimming size.

As a result, the area to which the blurring detection process is performed can be reduced. Therefore, power consumption of the battery can be suppressed. In addition, the blurring can be detected quickly since the area to which the blurring detection process is performed is small.

Figure 2:
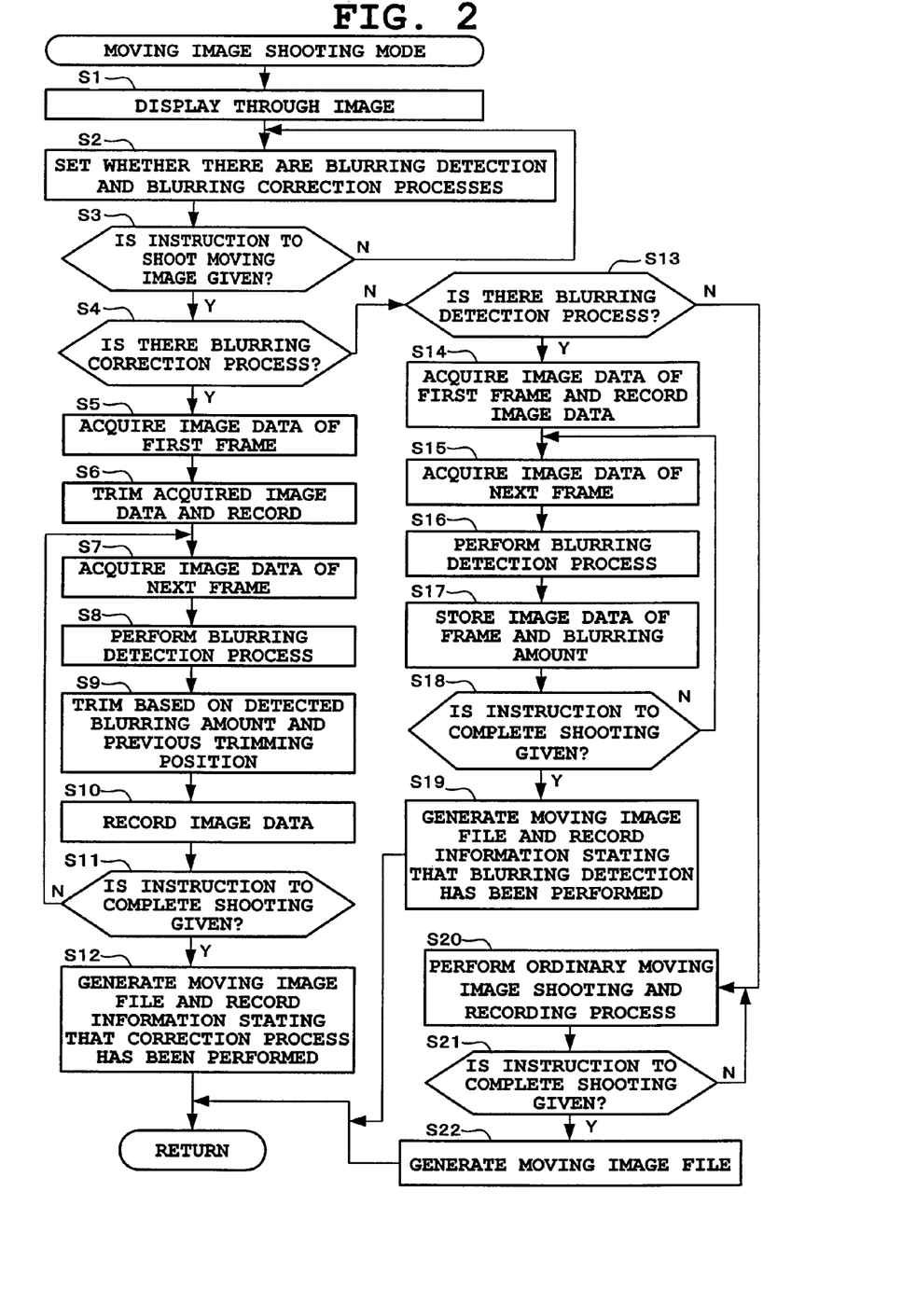
FIG. 2 is a flowchart of an operations performed during shooting, according to the embodiment.
Figure 4:
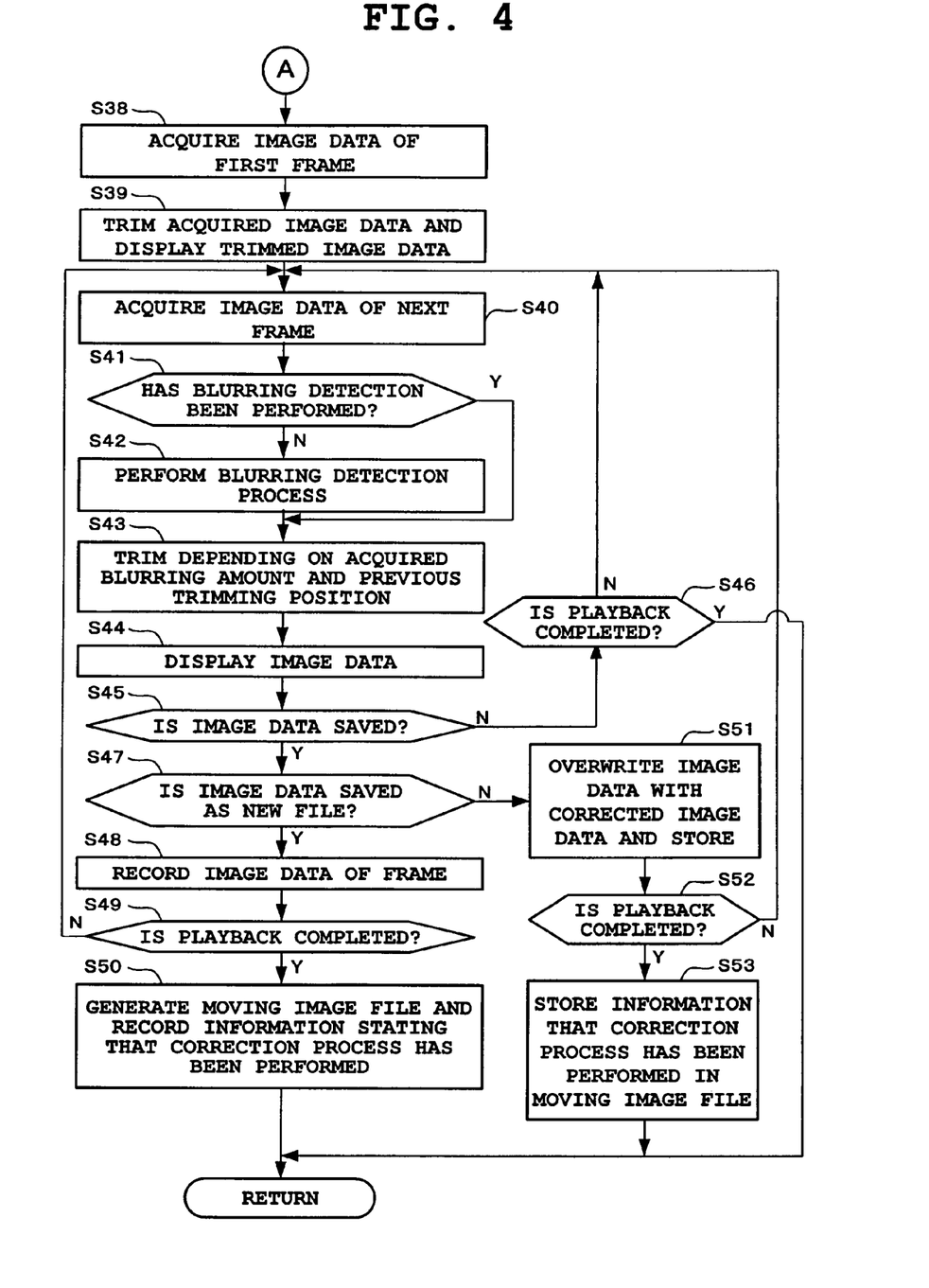
FIG. 4 is a flowchart of an operation performed during playback, according to the embodiment.
Figure 6:
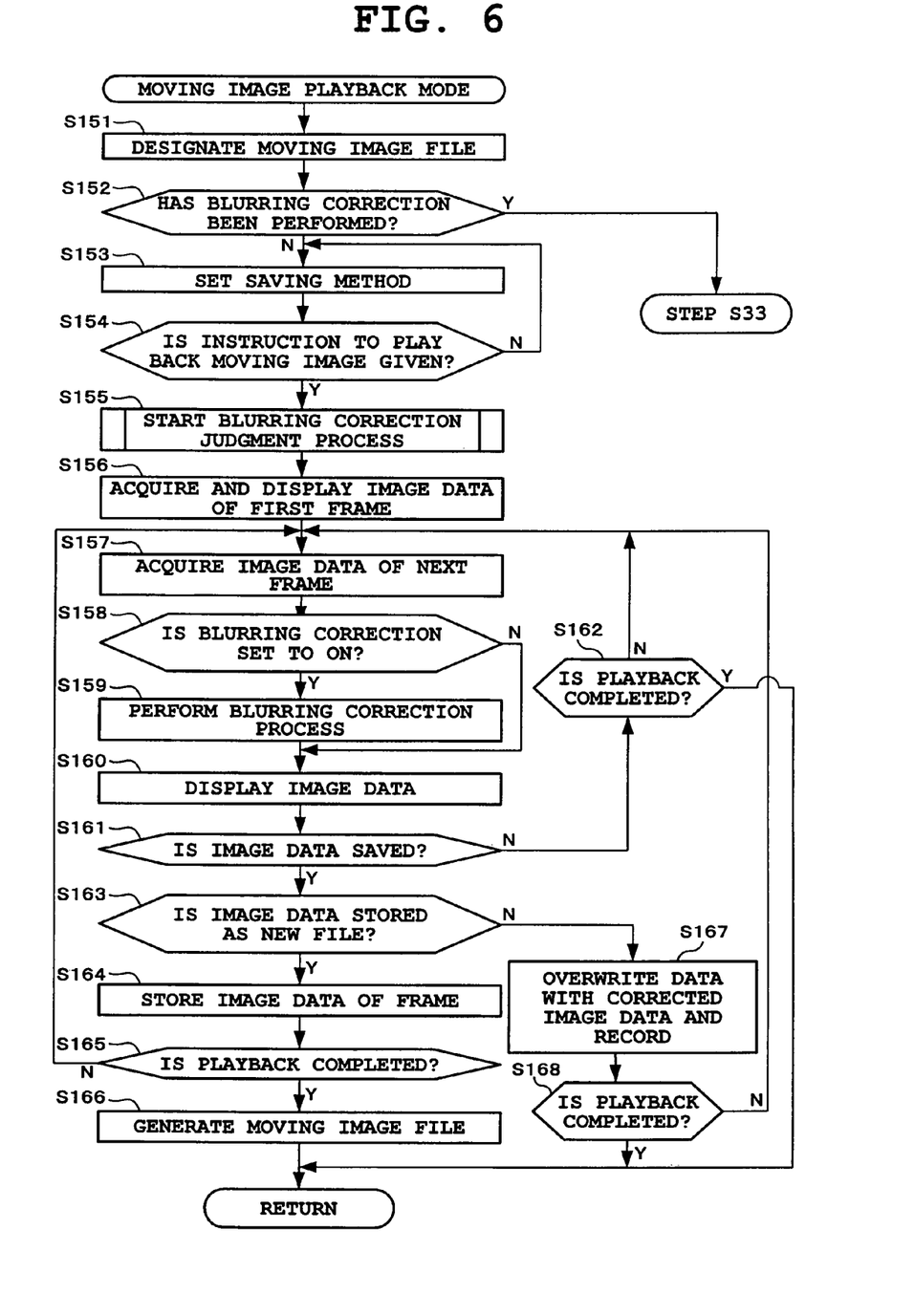
FIG. 6 is a flowchart of an operation performed by a digital camera in a variation example 2.

(2) According to the above embodiment and the variation examples 1 and 2, the trimming image is generated from the image data of the first frame based on the predetermined trimming position and trimming size, at Step S6 in FIG. 2, Step S39 in FIG. 4, and Step S156 in FIG. 6. However, the trimmed image data can be generated based on the trimming position and trimming size specified by the user.

The trimming position of the second frame is determined based on the trimming position specified by the user and the motion vector of the second frame. The trimming position of the third frame is determined based on the trimming position of the second frame and the motion vector of the third frame.

As a result, the user can designate a subject range to be trimmed, and the blurring in the image within the designated range can be corrected.

In addition, by a moving subject being designated as the subject range to be trimmed, the range occupied by the moving subject is larger compared to when the motion vector is calculated from all image data in the frame. Therefore, the motion of the subject has a significant influence on the detection of the motion vector. As a result, correction effects such as subject tracking can be expected.

(3) According to the above embodiment and the variation examples 1 and 2, the blurring is corrected by trimming based on the motion vector. However, a display position of the image data of the frame can be changed based on the motion vector, without trimming.

In addition, other methods can be used to perform the blurring correction on the image data. As long as the blurring correction can be performed, the method is not limited to trimming.

(4) According to the above embodiment, whether there is a blurring detection can be set before the moving image is shot. However, whether there is a blurring detection can also be set before the moving image is played back. In this case, when there is a blurring detection when the moving image is being played back, the moving image is played back and displayed. In addition, the blurring amount in the frame is detected, and the detected blurring amount is correlated with the frame and stored.

(5) According to the variation example 2, when the moving image is played back, whether the blurring correction is turned ON or OFF is judged depending on the blurring amount in the frame, and the blurring correction process is performed or not performed in adherence to the judgment. However, when the moving image is being shot, whether the blurring correction is turned ON or OFF can be judged based on the blurring amount in the frame and the blurring correction process can be controlled in adherence to the judgment, as well.

(6) The digital camera 1 according to the embodiment is not limited to the above embodiment. The digital camera 1 can be a cell phone with a camera feature, a personal digital assistant (PDA) with a camera feature, a personal computer with a camera feature, an integrated circuit (IC) recorder with a camera feature, a digital video camera, or the like. In other words, the digital camera 1 can be anything as long as the digital camera 1 is a device that can image a subject.

Furthermore, although the processing program of the digital camera which is a preferred embodiment of the present invention is stored in the memory (for example, ROM, etc.) of the digital camera, this processing program is stored on a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. A moving image playback device comprising:
   moving image playback means for playing back and displaying recorded moving image data;
   first detecting means for detecting a motion blurring amount in each frame of the recorded moving image data;
   first motion blurring correcting means for performing motion blurring correction on each frame of the recorded moving image data;
   first judging means for judging whether each frame of the recorded moving image data requires performing the motion blurring correction by the first motion blurring correcting means without re-detecting the motion blurring amount in each frame of the recorded moving image data which is a subject for playback by the moving image playback means; and
   playback controlling means for controlling the moving image playback means to play back and display the recorded moving image data while controlling the first motion blurring correcting means to perform motion blurring correction on a frame judged by the first judging means to require motion blurring correction, and for controlling the moving image playback means to play back and display the recorded moving image data without controlling the first motion blurring correcting means to perform motion blurring correction on a frame judged by the first judging means to not require motion blurring correction;
   wherein the first motion blurring correcting means performs the motion blurring correction on a frame based on the motion blurring amount in each frame detected by the first detecting means.

2. The moving image playback device according to claim 1, further comprising:
   second judging means for judging whether the motion blurring amount is correlated with the frame of the recorded moving image data and recorded;
   wherein the first motion blurring correcting means prevents the first detecting means from detecting the motion blurring amount in the frame and performs the motion blurring correction on the frame based on the correlated and recorded motion blurring amount, when the second judging means judges that the motion blurring amount is correlated with the frame and recorded.

3. The moving image playback device according to claim 1, wherein the first judging means judges that the motion blurring correction is not required when the recorded moving image data is moving image data on which the motion blurring correction has been performed in advance.

4. The moving image playback device according to claim 3, wherein the playback controlling means controls the moving image playback means to play back and display the recorded moving image data without controlling the first motion blurring correcting means to perform the motion blurring correction when the first judging means judges that the motion blurring correction is not required to be performed.

5. The moving image playback device according to claim 1, further comprising:
   recording controlling means for recording the moving image data on which the motion blurring correction has been performed to a recording means and attaching information to the moving image data stating that the blurring correction has been performed;
   wherein the first judging means judges that the motion blurring correction is required to be performed when the information stating that the motion blurring correction has been performed is not attached to the moving image data.

6. The moving image playback device according to claim 1, wherein the first judging means judges whether the motion blurring correction is required to be performed based on the motion blurring amount in a predetermined frame of the recorded moving image data to be played back by the moving image playback means.

7. The moving image playback device according to claim 6, wherein:
   the first judging means judges that the motion blurring correction is required when the motion blurring amount in the frame to be played back by the moving image playback means is equal to or more than a predetermined value.

8. The moving image playback device according to claim 1, wherein:
   the first judging means judges whether the motion blurring correction of the frame is required based on the motion blurring amount in the frame to be displayed; and
   the playback controlling means controls the first motion blurring correcting means to perform the motion blurring correction and controls the moving image playback means to play back and display the frame when the first judging means judges that the motion blurring correction is required, and controls the moving image playback means to play back and display the frame without controlling the first motion blurring correcting means to perform the motion blurring correction when the first judging means judges that the motion blurring correction is not required.

9. The moving image playback device according to claim 1, further comprising:
   moving image pickup and recording means for continuously imaging a subject and recording the image as moving image data;
   second detecting means for detecting the motion blurring amount in the frame of the moving image data imaged by the moving image pickup and recording means;
   second motion blurring correcting means for correcting motion blurring in the frame based on the motion blurring amount detected by the second detecting means;
   third judging means for judging whether the motion blurring correction is performed when the moving image pickup and recording means records the moving image data; and
   recording controlling means for controlling the moving image pickup and recording means to record the imaged moving image data while the second detecting means performs the motion blurring detection and the second motion blurring correcting means performs the motion blurring correction when the third judging means judges that the motion blurring correction is performed, and for controlling the moving image pickup and recording means to record the imaged moving image data without the second motion blurring correcting means performing the motion blurring correction when the moving image data is recorded when the third judging means judges that the motion blurring correction is not performed.

10. The moving image playback device according to claim 9, wherein:
    the third judging means further judges whether to perform only the motion blurring detection without performing the motion blurring correction when the moving image pickup and recording means records the moving image data; and
    the recording controlling means only controls the second detecting means to perform the motion blurring detection when the moving image data is recorded, correlates the motion blurring amount in the detected frame with the frame and records the motion blurring amount, when the third judging means judges that only the motion blurring detection is performed without performing the motion blurring correction.

11. The moving image playback device according to claim 9, wherein:
    the recording controlling means attaches information to the moving image data stating that the motion blurring correction has been performed and records the moving image data, when the moving image data on which the second motion blurring correcting means has performed the motion blurring correction is recorded; and
    the first judging means judges that the motion blurring correction is required to be performed when the information stating that the motion blurring correction has been performed is not attached to the moving image data.

12. The moving image playback device according to claim 9, wherein:
    the recording controlling means attaches information to the moving image data stating that the motion blurring correction has not been performed and records the moving image data, when the moving image data on which the second motion blurring correcting means has not performed the motion blurring correction is recorded; and
    the first judging means judges that the motion blurring correction is required to be performed when the information stating that the motion blurring correction has not been performed is attached to the moving image data.

13. The moving image playback device according to claim 9, wherein at least one of the first motion blurring correcting means and second motion blurring correcting means performs the motion blurring correction by generating trimmed image data based on the motion blurring amount in the frame.

14. The moving image playback device according to claim 9, wherein at least one of the first detecting means and second detecting means detects the motion blurring amount in the frame based on image data in a range of a portion of the frame.

15. The moving image playback device according to claim 14, further comprising:
    designating means for allowing a user to designate a trimming area to be trimmed;
    wherein at least one of the first detecting means and second detecting means detects the motion blurring amount in the frame based on the image data within a range based on the trimming area designated by the designating means; and at least one of the first motion blurring correcting means and second motion blurring correcting means generates trimmed image data based on the trimming area designated by the designating means and the motion blurring amount detected by at least one of the first detecting means and second detecting means.

16. A control method for a moving image playback device, comprising:

playing back and displaying recorded moving image data;

detecting a motion blurring amount in each frame of the recorded moving image data;

performing motion blurring correction on each frame of the recorded moving image data;

judging whether each frame of the recorded moving image data requires performing the motion blurring correction without re-detecting the motion blurring amount in each frame of the recorded moving image data which is a subject for playback; and playing back and displaying the recorded moving image data while performing the motion blurring correction on a frame judged to require the motion blurring correction, and playing back and displaying the recorded moving image data without performing the motion blurring correction on a frame judged not to require the motion blurring correction;

wherein the motion blurring correction is performed on a frame based on the motion blurring amount detected in each frame.

17. A computer-readable storage medium having a program stored thereon that is executable by a moving image playbook device to perform processes comprising:

playing back and displaying recorded moving image data;

detecting a motion blurring amount in each frame of the recorded moving image data;

performing motion blurring correction on each frame of the recorded moving image data;

judging whether each frame of the recorded moving image data requires performing the motion blurring correction without re-detecting the motion blurring amount in each frame of the recorded moving image data which is a subject playback; and playing back and displaying the moving image data while performing the motion blurring correction on a frame judged to require the motion blurring correction, and playing back and displaying the recorded moving image data without performing the motion blurring correction on a frame judged not to require the motion blurring correction;

wherein the motion blurring correction is performed on a frame based on the motion blurring amount detected in each frame.

* * * * *

UNITED STATES PATENT AND TRADEMARK OFFICE
CERTIFICATE OF CORRECTION

PATENT NO. : 7,697,034 B2 Page 1 of 1
APPLICATION NO. : 11/701341
DATED : April 13, 2010
INVENTOR(S) : Hiroshi Shimizu It is certified that error appears in the above-identified patent and that said Letters Patent is hereby corrected as shown below:

Column 20, line 16 (Claim 17, line 13), insert --for-- between "subject" and "playback".

Signed and Sealed this

Fifth Day of October, 2010

David J. Kappos
*Director of the United States Patent and Trademark Office*